INVENTOR.
AMOS D. BALLARD

HIS ATTORNEY

July 13, 1965   A. D. BALLARD   3,194,083
HOLLOW POWER TRANSMISSION MEMBERS
Filed May 11, 1964   2 Sheets-Sheet 2

INVENTOR.
AMOS D. BALLARD
BY
HIS ATTORNEY

3,194,083
HOLLOW POWER TRANSMISSION MEMBERS
Amos D. Ballard, Erie, Pa., assignor to General
Electric Company, a corporation of New York
Filed May 11, 1964, Ser. No. 366,573
5 Claims. (Cl. 74—431)

This invention relates generally to improved hollow power transmission members. While this invention is subject to a wide range of applications, it is especially suited for use in gear drives of the type wherein a gear driven hollow drive shaft, customarily referred to as a quill shaft, is arranged to transmit power to a driven shaft arranged therein with a tight interference fit, and will be particularly described in that connection.

Gear drives of the foregoing type are widely employed with rapid transit rail type vehicles with the gear driven quill shaft connected to the vehicle axle shaft with a very tight interference fit. Heretofore this tight interference fit between the solid axle shaft and the quill shaft produced a distortion of the quill shaft resulting in misadjustment and misalignment of the gears and bearings and necessitating a readjustment of the gear drive assembly after the quill shaft thereof was connected to the axle.

It is an object of this invention, therefore, to provide an improved hollow power transmission member which avoids one or more of the prior art difficulties.

It is a further object of this invention to provide hollow power transmission members which are essentially free of distortion when arranged to transmit power to a driven shaft arranged therein with a tight interference fit.

Briefly stated, in accordance with one aspect of this invention, the improved power transmission member comprises a pair of concentrically arranged hollow shaft members secured together near each end and being spaced apart throughout a major portion of their lengths to define a composite hollow shaft member having an inner and an outer cylindrical surface and an annular space therebetween. The inner cylindrical surface of the composite shaft includes a region of smaller diameter which is adapted for interference engagement with another shaft member whereby the hollow shaft is suitably connected thereto.

The novel features believed characteristic of this invention are particularly pointed out in the appended claims. The invention itself, however, may best be understood by reference to the following description taken in connection with the accompanying drawing in which:

Figure 1:
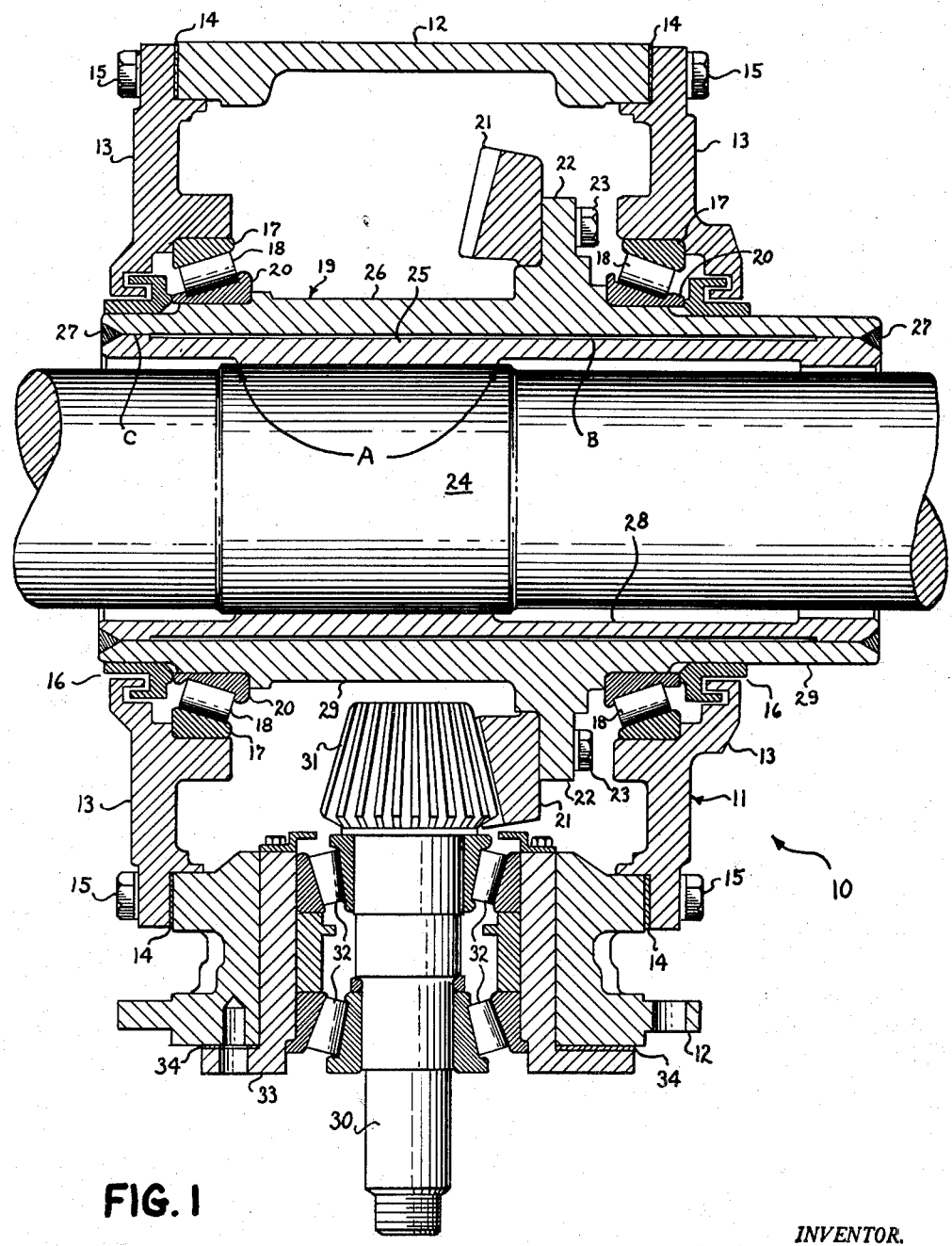
FIG. 1 is a cross sectional view of a gear drive assembly incorporating the hollow power transmission member of this invention.

Referring now to FIG. 1, there is shown a transmission 10 comprising a gear box 11 having a frame 12 and a pair of end plates 13. End plates 13 are spaced from frame 12 by annular shims 14 and are secured thereto by studs 15. Centrally located openings 16 are provided in each of the end plates 13 for receiving the outer races 17 of the bearings 18. A hollow power transmission member, shown as a quill shaft 19, is rotatably received through the centrally located opening 16 of end plates 13 and includes bearing fit areas adapted to receive the inner races 20 of the bearings 18. A ring gear, shown as the hypoid gear 21, is mounted on an annular flange 22 of the quill shaft 19 by studs 23. Quill shaft 19 is provided with a region A of smaller inside diameter adapted to receive a shaft, shown as axle 24, in an interference fit.

In further accordance with this invention, quill shaft 19 is made up from two concentrically arranged hollow shaft members 25 and 26 which are secured together near each end such as by the welds 27. Hollow shaft members 25 and 26 are spaced apart, as shown at the region B, along a major portion of their remaining lengths to define a composite quill shaft 19 having an inner cylindrical surface 28 and an outer cylindrical surface 29. The region A is provided integral with the inner cylindrical surface 28 and defines a region of smaller inside diameter adapted for interference engagement with the axle shaft 24.

The annular space B between the hollow shaft members 25 and 26 may be conveniently provided by providing hollow shaft member 25 with an undercut portion of its outside surface to provide a region thereof having a diameter smaller than the inside diameter of hollow shaft member 26 so that when the two hollow shaft members are concentrically arranged they will be spaced apart at the undercut portion. The annular space B extends axially toward the opposite ends of quill shaft 19 and beyond the portions thereof defining the bearing fit areas upon which bearings 18 are mounted. Preferably, the opposite ends of hollow shaft members 25 and 26 have their outside and inside diameters, respectively, machined so as to obtain a slip fit region shown at C. The first hollow shaft member 25, therefore, may then be suitably arranged inside the second hollow shaft member 26 and the ends thereof registered so that they are concentric. Conveniently, the hollow shaft members 25 and 26 are grooved in the form of a V and thereafter welded together as shown at 27.

The transmission 10 also includes a shaft 30 carrying a pinion gear, shown as the hypoid gear 31, rotatably supported by bearings 32 mounted in a sleeve 33 disposed in an opening of frame 12. Pinion gear 31 is brought into axial alignment with ring gear 21 by the shims 14 and in radial alignment therewith by suitable use of the shims 34.

When the axle shaft 24 is connected by an interference engagement with the region A of quill shaft 19, the hollow shaft member 25 distorts due to the force of this interference fit but this distortion is not transmitted to the hollow shaft member 26 of quill shaft 19. Instead, hollow shaft member 25 merely expands radially into the axially disposed space between hollow shaft members 25 and 26 without affecting the outer cylindrical surface 29 of quill shaft member 19.

When constructed in accordance with this invention, therefore, the transmission 10 may readily be provided as a complete subassembly with the gears and bearings accurately aligned and adjusted. The unit may then be shipped to the customer who completes the final assembly to the vehicle by causing the region A of hollow shaft member 25 of quill shaft 19 to be secured by press fitting to the axle shaft 24 in accordance with the foregoing description. Since this press fit does not cause any distortion to the outer cylindrical surface 29 of the quill shaft member 19, the alignment and adjustment of the gears and bearings remain the same as before such press fitting and therefore, the need for any subsequent readjustment and realignment is eliminated.

Figure 2:
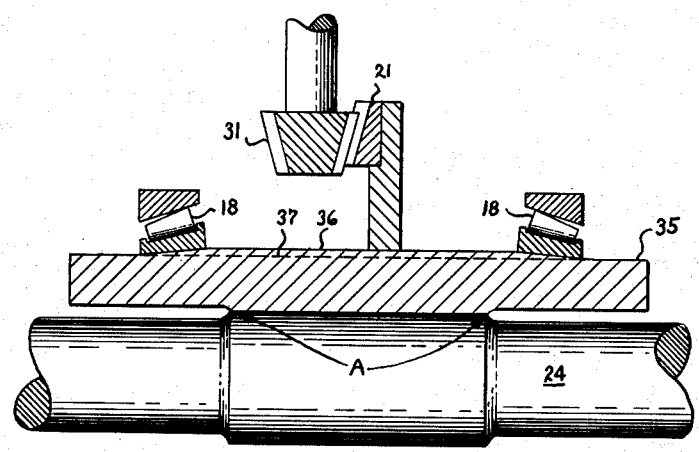
FIG. 2 is a diagrammatic view illustrating the distortion problems associated with hollow power transmission members in accordance with prior art.
Figure 3:
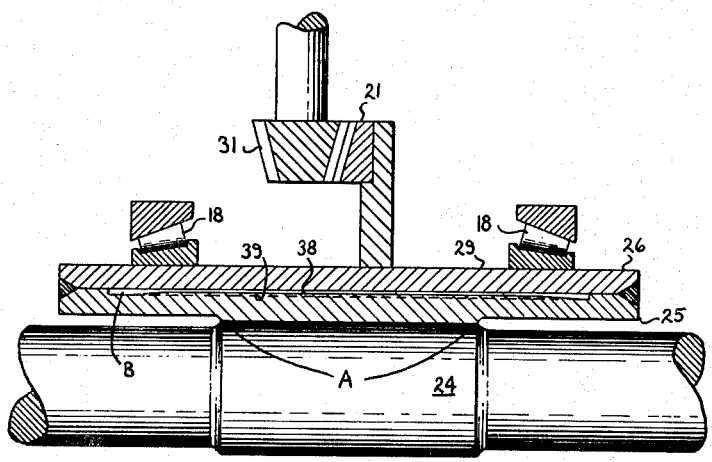
FIG. 3 is a diagrammatic view illustrating the advantages achieved by employing the improved hollow power transmission member of this invention.

The improvement and advantages achieved in accordance with this invention may be still more clearly pointed out by reference to FIGS. 2 and 3. FIG. 2 illustrates one form of the prior art type hollow power transmission members shown as a quill shaft 35. When the region A of quill shaft 35 is press fit to the axle shaft 24, the distortion which results is shown by the solid line 36; the broken line 37 illustrating its position before being pressed to the axle shaft 24. It is apparent, therefore, that the roller bearings 18 have been distorted from their proper position by this displacement of quill shaft 35 and also that the gears 21 and 31 have been displaced and misaligned. Accordingly, the gears and bearings must be realigned by suitable use of the shims after the unit has been assembled to the vehicle axle.

FIG. 3 illustrates diagrammatically the arrangement of the transmission of FIG. 1 incorporating the power transmission member of this invention. As shown, the press fitting of axle shaft 24 to quill shaft 19 results in a distortion of only the hollow shaft member 25. This distortion is shown by the solid line 38; the broken line 39 illustrating its position before being pressed to the axle shaft 24. Thus, it may be seen that the radial expansion of the first hollow shaft member 25 resulting from the forces due to the interference fit with axle shaft 24, is into the hollow region B but has not affected in any way the outside diameter 29 of the second hollow shaft member 26. Accordingly, the distortion transmitted to the gears 21 and 31 and bearings 18 in the prior constructions has been completely eliminated and the need for subsequent readjustment and realignment by the customer is unnecessary. For example, since the press fit of region A of inner hollow shaft member 25 to axle 24 does not result in any distortion of the outer hollow shaft member 26 of quill shaft 19, no readjustment of the bearings or realignment of the gears is required. Thus, it is readily apparent that the prior art distortion problems are completely overcome by the present invention.

While only certain preferred features and embodiments of the present invention have been shown by way of illustration, many modifications and changes will occur to those skilled in the art. It is, therefore, to be understood that the appended claims are intended to cover all such changes and modifications as fall within the true spirit and scope of this invention.

What I claim as new and desire to secure by Letters Patent of the United States is:

1. A hollow power transmitting member comprising: first and second concentrically arranged hollow shaft members secured together and being spaced apart along a major portion of their lengths to define a composite hollow shaft having an inner cylindrical surface, an outer cylindrical surface and an annular space between; and means integral with said inner cylindrical surface defining a region of smaller diameter adapted for interference engagement with another shaft member.

2. A hollow power transmitting member comprising: first and second concentrically arranged hollow shaft members secured together near each end and spaced apart along the remaining portion of their length; and means integral with the inner surface of said first hollow shaft member defining a region of smaller inside diameter adapted for interference engagement with another shaft member.

3. A hollow power transmitting member comprising: first and second concentrically arranged hollow shaft members secured together to define a composite hollow shaft, at least a portion of said first hollow shaft member having an outside diameter substantially smaller than the inside diameter of said second hollow shaft member to define a longitudinally extending annular space between said concentrically arranged hollow shaft members; and means associated with the inner surface of said first hollow shaft member defining a region of smaller inside diameter adapted for interference engagement with another shaft.

4. A hollow power transmitting member comprising: first and second concentrically arranged hollow shaft members secured together to define a composite hollow shaft member having an inner cylindrical surface and an outer cylindrical surface, at least a portion of said first hollow shaft member having an outside diameter substantially smaller than the inside diameter of said second shaft to define a space between said concentrically arranged hollow shafts extending along a major portion of their length; means associated with the outer surface of said second hollow shaft member for receiving a ring gear; means defining bearing fit areas near each end of said second hollow shaft member; and means associated with said first hollow shaft member defining a region intermediate the ends thereof having a diameter smaller than the inside diameter of said first hollow shaft member and adapted for intereference engagement with another shaft.

5. The power transmitting member of claim 4 wherein said annular space between said concentrically arranged shafts extend substantially beyond said region adapted for interference engagement with said other shaft.

No references cited.

DON A. WAITE, *Primary Examiner.*